3,597,392
FUNCTIONALLY SUBSTITUTED HIGHLY
ORDERED AZO-AROMATIC POLYIMIDES
Hartwig Bach and Helmuth E. Hinderer, Durham, N.C.,
assignors to Monsanto Company, St. Louis, Mo.
No Drawing. Filed Jan. 21, 1969, Ser. No. 792,824
Int. Cl. C08g 20/32
U.S. Cl. 260—47CP                                    6 Claims

ABSTRACT OF THE DISCLOSURE

A class of ordered fiber and film-forming aromatic polyamide acids and corresponding polyimides derived from certain symmetrical aromatic azo diamines bearing acid, hydroxyl or mercapto substituents or derivatives hydrolyzable to such substituents have been found to possess excellent thermal, and mechanical properties useful in fibers, films and other shaped articles.

---

This invention relates to a novel class of polyamide acids, the corresponding polyimides and to fibers, films and other shaped articles derived therefrom.

More particularly, the invention relates to the preparation of fiber and film forming polyamide acids and polyimides from a particular class of symmetrical aromatic azo diamines bearing certain functional substituents.

The ordered azo aromatic polyamide acids and polyimides of this invention can be prepared by conventional polymerization and cyclization techniques to provide products having improved mechanical and thermal properties.

Accordingly, it becomes an object of this invention to provide a new class of ordered, aromatic azo polymers containing imide linkages.

These and other objects will become apparent to those skilled in the art from the ensuing description.

The novel fiber and film forming polyamide acids and polyimides of this invention are respectively represented by the following structural formulas:

$$\left[ \begin{array}{c} HO-\overset{O}{\underset{}{C}} \quad \overset{O}{\underset{}{C}}-OH \\ -NH \quad R \quad NH-Ar-N=N-Ar- \\ \overset{}{\underset{O}{C}} \quad \overset{}{\underset{O}{C}} \quad \overset{|}{X} \quad \overset{|}{X} \end{array} \right] \text{ and}$$

$$\left[ \begin{array}{c} \overset{O}{\underset{}{C}} \quad \overset{O}{\underset{}{C}} \\ -N \quad R \quad N-Ar-N=N-Ar- \\ \overset{}{\underset{O}{C}} \quad \overset{}{\underset{O}{C}} \quad \overset{|}{X} \quad \overset{|}{X} \end{array} \right]$$

where R represents a tetravalent aromatic radical having paired valence bonds on adjacent cyclic carbon atoms and $$-Ar-\atop{|\atop X}$$

represents an asymmetrical divalent aromatic radical and —X represents an acid, mercapto or hydroxyl group or a group hydrolyzable thereto.

The polyamide acids above described may be conveniently prepared by the polymerization of an aromatic acid dianhydride with diamines hereafter described whereupon the thus formed polyamide acids can be thermally or chemically dehydrated to form the corresponding polyimides.

The symmetrical diamines useful in the preparation of the polyamides of this invention are represented by the formula, $$NH_2'-Ar-N=N-Ar-NH_2\atop{|\atop X}\qquad{|\atop X}$$

They may be prepared by an oxidative coupling reaction which involves dimerization of certain asymmetrical aromatic diamines represented by the formula $$NH_2'-Ar-NH_2\atop{|\atop X}$$

where $NH_2'$— represents a primary amino group possessed of basicity different from the $NH_2$— amino group, Ar and X being the same as above indicated. Ar is further characterized by benzenoid unsaturation and possessing resonance in the classic sense. The X substituted Ar radicals include those derived from X substituted benzene, naphthalene, biphenyl and bridged biphenyl such as diphenyl sulfone and diphenyl ether. The X substituted divalent heterocyclic radicals may contain one or more heteroatoms such as —O—, —S—, $$-N-\atop{|\atop R}$$

and —N=, representative of which are X substituted divalent radicals derived from pyridine, oxadiazole, thiazole, imidazole, pyrimidine and the like. In the case of multicyclic ring systems individual rings may be linked through aromatic carbon to aromatic carbon bonds or through divalent aliphatic, alicyclic or inorganic linking groups such as $$-O-,\ -S-,\ -\overset{O}{\underset{}{S}}-,\ -\overset{O}{\underset{O}{S}}-,\ -\overset{O}{\underset{}{C}}-,\ -\overset{O}{\underset{}{C}}NH-,\ -\overset{O}{\underset{R'}{P}}-,\ -\overset{O}{\underset{R'}{P}}-$$

$$-N-,\ -N=N-,\ -(CR_2)_n-\ \text{and}\ -(CH=CH)_m-\atop{|\atop R'}$$

where $R^1$ represents hydrogen or lower alkyl, $n$ is 1 to 6 and $m$ is 1 or 2.

The substituent, X, attached to the diamine used in this invention represents a mercapto, an hydroxyl or an acid or acid salt group or a derivative thereof which may be hydrolyzed to a mercapto, an hydroxyl group, an acid group, respectively.

Typical of the acid groups contemplated within the scope of this invention are carboxylic acid, sulfinic acid, sulfonic acid, oxysulfonic acid, phosphoric acid, oxyphosphonic acid, alkali metal, alkaline earth metal, ammonia and amine salts thereof. The derivatives hydrolyzable to the acid functions described are typically the acid halides including the iodide, fluoride, chloride and bromide, esters of phenols, and aliphatic and alicyclic alcohols having less than 12 carbon atoms and amides of ammonia, primary and secondary amines having up to 12 carbon atoms. Common derivatives of mercapto and hydroxyl substituents which may be hydrolyzed to the mercapto or hydroxyl groups are aromatic, aliphatic and alicyclic ethers, having up to 12 carbon atoms, and esters of aromatic, aliphatic and alicyclic carboxylic acids having up to 12 carbon atoms.

The X substituents according to this invention are attached directly to a cyclic aromatic carbon atom of the Ar radical and typically include groups such as,

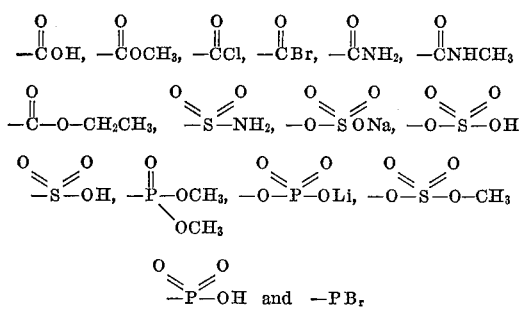

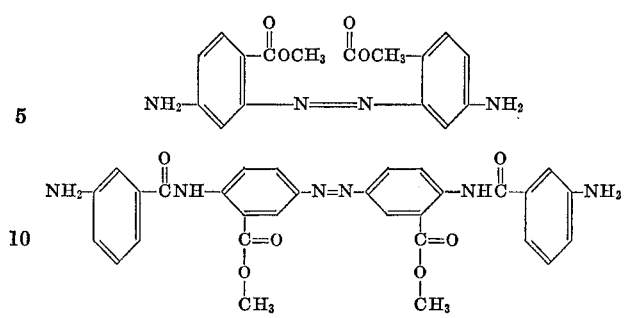

Representative of the mercapto and hydroxyl substituents and derivatives hydrolyzable to mercapto and hydroxyl substituents are

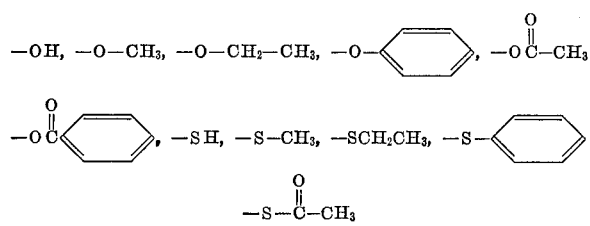

and the like.

As a general rule the amides, ethers and esters function as intermediates both for the diamines and polymer preparations as hereinafter described by blocking the reactive mercapto, hydroxyl or acid substituents prior to manufacture of shaped articles from the fiber and film forming polymers. Thus, in the preparation of a symmetrical aromatic azo diamine bearing a carboxylic acid or carboxylic acid chloride group, a functional derivative which blocks the reactivity of such group may be employed in the intermediate processes. Typical of the diamines contemplated within the scope of this invention are the following:

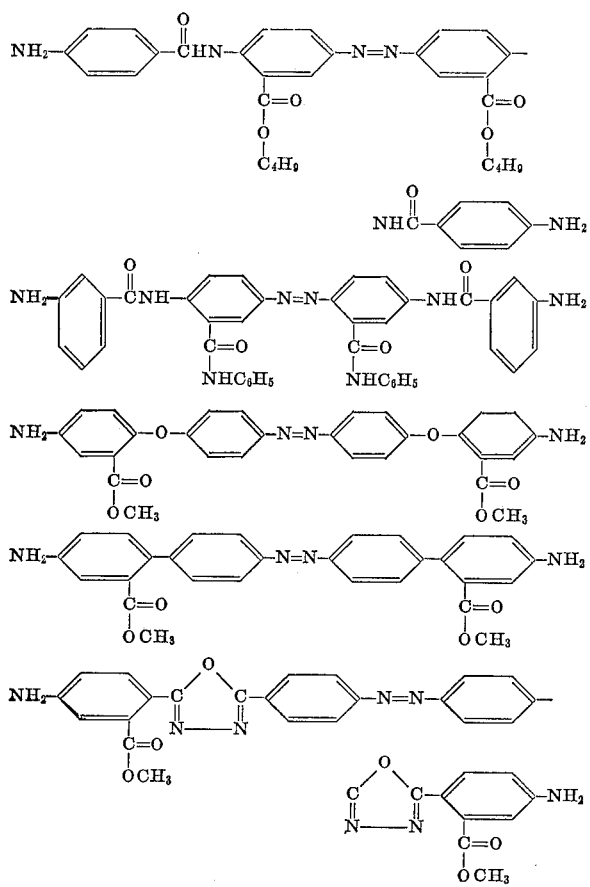

The reactant diamines employed to prepare the azo diamines used in this invention are generally known in the art and can be prepared by means already known to those skilled in the art.

The symmetrical aromatic azo diamines of this invention can be prepared by the oxidative coupling of asymmetrical aromatic diamines in solution utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salt such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride, cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the preferentially oxidizable amino group of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethyl amine, tributylamine, diethylmethylamine and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent by it may also be used as the reaction medium. It was found, in the course of this work, that reaction media in which the products of the reaction are relatively insoluble lead to a cleaner, simpler separation of product from catalyst and by-products, thus increasing the yield of symmetrical diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

The order of addition of the various reactants is not critical. In one preferred mode of carrying out this invention, the catalyst may be prepared by oxidizing cuprous chloride in a base such a pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about $-30°$ C. to about $120°$ C., preferably from about $-20°$ C. to about $70°$ C. It has been found that the catalyst preparation may be carried out conveniently and preferably at room temperature. The rate of reaction is satisfactory at these temperatures and a very efficient catalyst is produced.

The surprising feature of the oxidative coupling reaction of asymmetrical aromatic diamines is that the dimer product obtained is essentially the only product resulting from the process. The selective oxidation of one amino group of the asymmetrical diamine, to the exclusion of the other amino group, which is equally reactive, is indeed unexpected. It is believed that the catalyst reacts preferentially with the more basic amino groups of the starting material, as long as they are present in the mixture. This theory is further strengthened by the fact that greater care must be taken in controlling the reaction conditions, as the difference in basicity of the starting material and product becomes smaller, in order to obtain high yields of pure dimer.

Determination of the basicities of the amino groups of the starting diamine and the product can be helpful in predicting suitable conditions for carrying out the reaction. In general, as the difference in basicity between the amino groups to be oxidized of the starting material and product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The ordered condensation polymers of this invention may be prepared by reacting an azo-aromatic diamine, above described, with an aromatic acid dianhydride. Suitable aromatic acid dianhydrides, which may be used, are those generally known in the art and represented by the general formula:

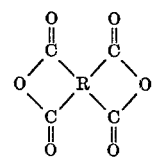

The preferred aromatic acid dianhydrides, suitable for use in the present invention, are those in which the four carbonyl groups of the anhydride are each attached directly to separate carbon atoms in the aromatic ring, and wherein the carbon atoms of each pair of carbonyl groups are attached to adjacent carbon atoms in the aromatic ring, resulting in the formation of a five membered ring.

Examples of aromatic diacid dianhydrides which may be used to prepare the polymers of this invention include: pyromellitic dianhydride; 2,3,6,7-naphthalene tetracarboxylic dianhydride; 3,4,3',4'-diphenyl tetracarboxylic dianhydride; bis(3,4-dicarboxyl phenyl) sulfone dianhydride; benzene-1,2,3,4-tetracarboxylic dianhydride; 1,1-bis-(3,4-dicarboxyl phenyl)methane dianhydride; pyrazine-2,3,5,6-tetracarboxylic dianhydride; 1,1-bis(3,4-dicarboxy phenyl)ether dianhydride, and the like.

Examples of the ordered polyimides of this invention, obtainable by the reaction of the above described azo-aromatic diamines and aromatic acid dianhydrides and embraced by the general formulas previously shown include the following:

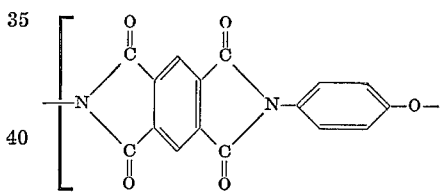

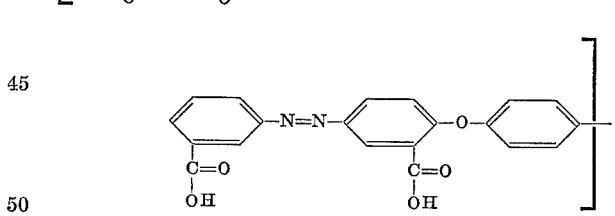

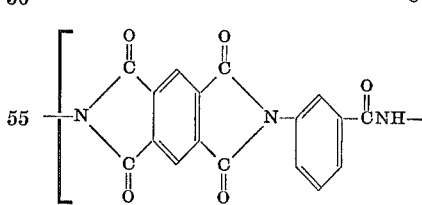

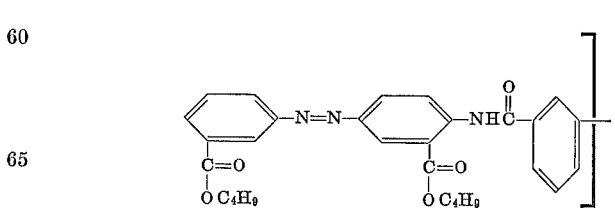

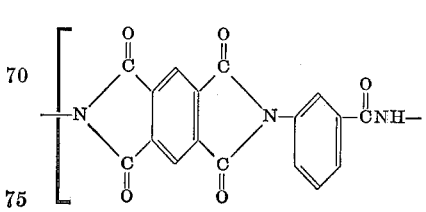

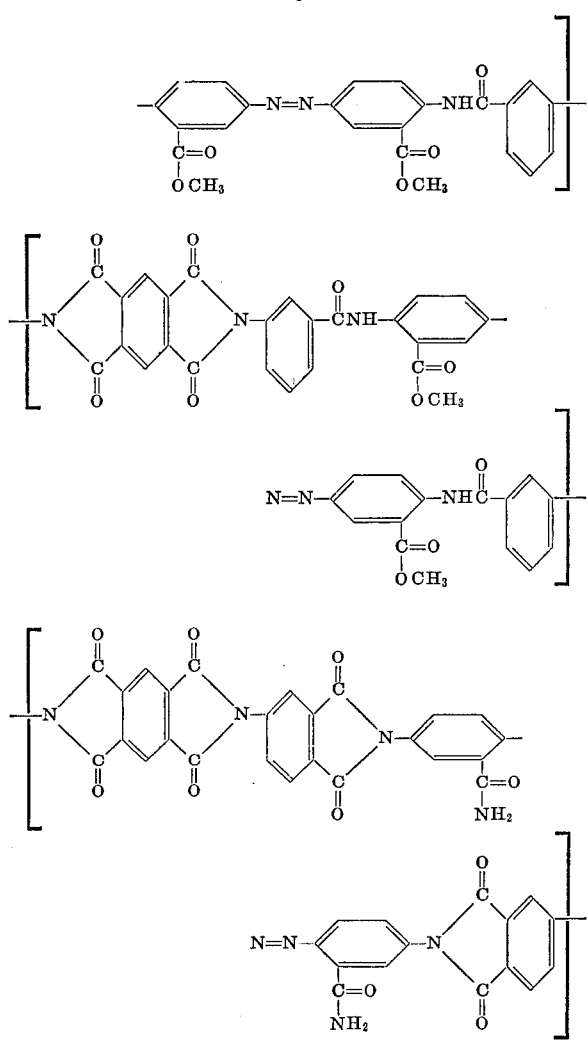

In a preferred method for the preparation of the polyimides of this invention, a polyamide-acid is first prepared by the reaction of at least one of the aforementioned diamines with at least one tetracarboxylic acid dianhydride in an organic solvent for at least one of the reactants, the solvent being inert to the reactants. Preferably, the reaction is carried out under substantially anhydrous conditions for a period of time and at a temperature sufficient to result in complete reaction. The polymerization reaction is very sensitive to the stoichiometric equivalence of the diamine and dianhydride and in order to obtain high molecular weight polyamide-acid, essentially equivalent molar amounts of the reactants should be used. For most purposes, the polyamide acid should have an inherent viscosity of at least 0.1, and preferably 0.3–0.5, as measured as a 0.5% solution at 30° C. in a suitable solvent, for satisfactory conversion to the polymers of this invention.

Otherwise stated the number of repeat or recurring units in the polymer chain should reflect viscosities sufficient to enable the formation of fibers, films and other shaped articles for which the polymers find use.

The polyamide acid may then be converted to the corresponding polyimide by a heat treatment or chemically by treatment with any of the dehydrating systems used for such purposes, such as, for example, acetic anhydride in pyridine. It is generally preferable to form the desired shaped structure from the polyamide acid composition prior to conversion to the polyimide. However, a partial conversion to the polyimide structure, prior to forming the shaped article, is sometimes desirable and preferable. It has been found that a reaction product containing a polymeric component of at least 50% polyamide-acid will usually be sufficient to give a shapable composition.

The solvents useful for synthesizing the intermediate polyamide-acid compositions in the preferred method for preparing the polyimides of this invention must not react with either of the reactants (i.e. diamine or dianhydride) to any appreciable extent. Besides being inert to the reactants, and preferably being a solvent for the product, the organic solvent used must be a solvent for at least one and preferably both of the reactants. The preferred solvents are the lower molecular weight members of the N,N-dialkylcarboxylamide class such as for example N,N-dimethylformamide, N,N-dimethylacetamide and N,N-diethylformamide. Other suitable solvents which may be used are dimethylsulfoxide, dimethylsulfone, hexamethylphosphoramide, N-methyl-2-pyrrolidone and formamide. The solvents may be used alone, or in combinations of two or more solvents. The preferred solvents may also be used in combination with poor solvents such as benzene or hexane, in some cases, without any adverse effect on the results.

The optimum time and temperature for forming the polyamide-acid of a specified diamine and dianhydride will depend on a number of factors, such as temperature, solvent used, and the concentration and solubility of the reactants and product. For best results, it is generally preferable to carry out the reaction at a temperature close to the maximum permissible for the given system. The maximum permissible temperature will depend on a number of factors among which are the diamine and dianhydride used, the solvent, the concentration of polyamide-acid desired in the final composition, and the minimum time desired for completion of the reaction. The optimum temperature will vary with the reactants and other conditions but may be easily determined experimentally. In order to obtain the maximum degree of polymerization for any given combination of diamine and dianhydride, it has been found that the temperature should be maintained below 60° C. and preferably below 50° C. during the reaction.

Since the reaction is exothermic and tends to accelerate rapidly, it is sometimes necessary, particularly in the case of large scale preparations, to regulate the rate of polymerization in order to maintain the reaction temperature at the desired level. A relatively simple means for providing control of the temperature and rate of the reaction, involves pre-mixing equimolar amounts of the diamine and dianhydride and then adding this mixture in small increments with agitation to the solvent. Alternatively, the diamine may be dissolved in the solvent and the dianhydride added in small amounts and at a rate which permits control of the reaction. Or the diamine may be dissolved in one portion of solvent, the dianhydride in another portion of the same or another solvent and the polymerization controlled by mixing the two solutions at the required rate and stirring.

The quantity of solvent used may vary from the minimum amount needed to dissolve enough of the diamine to initiate the reaction, to an amount which will result in very dilute polymer solutions. The final concentration of polymer in solvent may vary over a considerable range and will depend on the requirements for forming the shaped articles, the degree of polymerization and the amount of polyamide-acid in the composition. For best results, the solution may contain from 1% to 40% of the polymeric component. A concentration of about 5% to 15% is generally best for fiber formation, whereas a concentration of 40% to 50% may be required for best results in forming shaped articles such as bearings or gears from these compositions.

The degree of polymerization of the polyamide-acid may be easily controlled and maintained at the desired level, by properly adjusting the stoichiometry of the reaction. Very high molecular weight polymers may be obtainable by using equal molar amounts of the reactants; whereas the use of an excess of either reactant limits the molecular weight obtainable.

As previously mentioned, the polyamide-acids of this invention may be converted to the corresponding polyimide by a heat treatment or by a chemical treatment. Heating may be carried out at temperatures above 50° C. and, preferably above 100° C. for periods of from several minutes to several hours. Heating serves to convert pairs of amide and carboxylic acid groups to polyimide groups by the elimination of water. The optimum time-temperature conditions for conversion of a given polyamide-acid to the corresponding polyimide will depend on the structure of the polyimide. These conditions may be readily determined by a few well chosen experiments. It has been found that after completion of the conversion at lower temperatures, the thermal and hydrolytic stability of most of these polyimides may be improved by a further treatment at 300–500° C. for 10–20 seconds.

The polyamide-acid polymers may also be converted to polyimides by a chemical treatment which usually involves treating the polymer with a dehydrating agent alone, or preferably in combination with a catalyst. For example, polyamide-acid films may be treated in a bath containing an acetic anhydride-pyridine mixture. The ratio of acetic anhydride to pyridine, as well as the temperature of treatment may vary over a wide range. Other dehydrating agents which may be used include propionic anhydride and butyric anhydride; and other catalysts which may be used include other tertiary amines such as triethylamine and quinoline. In some cases, it may be preferable to carry out the conversion to polyimides by a combination of a heat treatment and a chemical treatment. For example, partial conversion may be attained by a chemical treatment and the conversion then completed by a subsequent heat treatment or vice versa.

Shaped articles, derived from these polymers, posssess excellent properties at room temperature and display a resistance toward various types of degradation that is unique for an organic polymer. The outstanding characteristic of shaped articles, derived from these polymers, however, is the retention of their electrical and physical properties as well as stability, on exposure to elevated temperatures for prolonged periods of time.

The polymers of this invention may be used in a wide variety of applications, either alone, such as, for example in coatings, films, fibers, foams or resins; or in combination with other materials, such as, for example in reinforced plastics, laminated structures, composites, etc.

Solutions of the polyamide-acids of this invention may be applied as a coating composition to a wide variety of materials such as metals, glass, wood, paper and synthetic polymers, in the form of wires, sheets, fibers, foams, fabrics, etc. The coatings may be then converted to polyimide coatings by one of the methods previously described. Because of their excellent electrical properties and heat resistance, these polymers may be especially useful as electrical coatings.

Solutions of the polyamide-acids of this invention may also be spun into fibers or filaments by conventional dry or wet spinning techniques and subsequently converted into polyimides by a chemical or heat treatment. In fiber form, the polymers of this invention may be especially useful for high temperature electrical insulation, protective clothing and filtration media.

Films of varying thickness may be cast from the polyamide-acid solutions of this invention using well known procedures. These films can then be converted into polyimide films by one of the previously described techniques. The films can be used in wrapping and packaging applications, such as for wrapping corrosion resistant pipe and cables, container linings, and protective bags, for high temperature insulation such as in transformers, capacitors, and motors; for laminated structures, such as metal sheets or strips and flat wire; and for electrical printed circuits. The moderately high dielectric constant and low dissipation factor make these films especially useful as high temperature dielectric materials.

Foams, derived from the polymers of this invention, may be prepared by introducing blowing agents, air, or carbon dioxide into the polyamide-acid polymer solutions with vigorous agitation and subsequently adding a converting agent or catalyst. The mixture may then be shaped into the desired form by casting on a smooth surface or placing in a mold, and then converted to a polyimide foam by drying and heating. Typical uses of the foamed products derived from the polymers of this invention are in various types of insulation for appliances, heat shields, firedoors, etc.; in laminating other materials; in films, and other uses requiring a combination of good dielectric properties and flame resistance.

Resins may be prepared from these polymers, which may be useful in the fabrication of gaskets, piston rings, bearings, and as a binder, due to their high abrasion resistance and resistance to creep and cold flow.

It should be understood that the polymers of this invention may be mixed with other inert materials prior to shaping, in which case they make excellent binders for composite structures.

The following examples illustrate several embodiments of the invention and are not intended to define the limits and scope thereof.

EXAMPLE I

Preparation of 3,3'-dicarbomethoxy-4,4'-di(3-aminobenzamido)-azobenzene

The catalyst was prepared by oxidizing 2.0 g. of cuprous chloride in a mixture of 120 ml. of DMAc and 40 ml. of pyridine using 131 ml. of oxygen. 2'-carbomethoxy-3,4'-diaminobenzanilide (12.90 g., 0.045 mole) was added and oxidative coupling conducted at 21–22° C. for 113 min. during which time 604 ml. of oxygen was consumed. This volume is slightly higher than that calculated for dimerization (543 ml.), but the rate of consumption had become substantially slower by the time the volume required for dimerization had been used. The yellow-green product was filtered off and dried in vacuo giving 8.5 g. (66.5% yield) of material melting at 265.5° C. After recrystallization from pyridine the material melted at 265.5–266.5° C. (dec.).

*Analysis.*—Calcd. for $C_{30}H_{26}N_6O_6$ (percent): C, 63.59; H, 4.87; N, 14.83. Found (percent): C, 62.98; H, 4.55; N, 14.64.

Thin layer chromatography of the alkaline hydrolysate of this new azodiamine showed m-aminobenzoic acid as a hydrolysis product.

This observation is evidence that coupling occurred via the 4'-amino group.

Polyamide acid and polyimide preparation

To a chilled mixture of 0.567 g. (0.001 mole) of monomer, 6 ml. HPT and 2 ml. of DMAc was added 0.218 g. (0.001 mole) of pyromellitic dianhydride. The ice bath was removed after 1 hr., 3 ml. of DMAc was added and the mixture was stirred at room temperature overnight. The dope was cast into a self-supporting film (dried at 90–95° for 4 hrs.). Conversion to the polyimide was effected by curing at 140° for 16 hrs., then at 300° for 1 hr. The now brown-purple film was self-supporting. The resulting polyimide is characterized by repeating units having the formula:

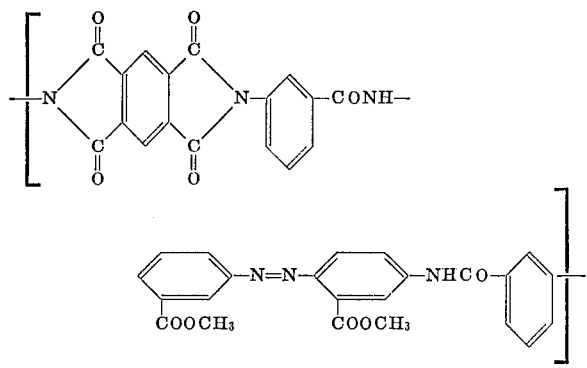

EXAMPLE II

Preparation of 3,3'-dicarbobutoxy-4,4'-bis(3-aminobenzamido)azobenzene

The catalyst was prepared by oxidizing 1.0 g. of cuprous chloride with oxygen in a mixture of 60 ml. of DMAc and 20 ml. of pyridine. There was added 6.56 g. (0.020 mole) of 2'-carbobutoxy-3,4'-diaminobenzanilide and the coupling allowed to proceed for 48 min. at 24.5–30° C. (exotherm) utilizing 245 ml. of oxygen (calcuuated for dimerization, 244 ml.). To the filtered solution was added water (400 ml.), and the resultant pasty precipitate was collected (centrifugation), washed and dried in vacuo. The green, amorphous material weighed 5.95 g. (91.3% crude yield) and melted over a wide range beginning at 225° C.

Polyamide acid and polyimide preparation

A mixture of 0.650 g. (0.001 mole) of N,N'-bis(m-amino-benzoyl)-3,3'-dicarbobutoxy - 4,4' - diamino-azobenzene and 5 ml. of DMAc was chilled and 0.218 g. (0.001 mole) of pyromellitic anhydride was added. The mixture was kept in an ice-water bath for 3 hrs., then at ambient temperature for 24 hrs. The resultant dope was dry-cast to a green-brown film (dried at 95–100° for 2 hrs.) which was converted to the polyimide by curing at 140° for 16 hrs. and at 300° for 1 hr. The resultant red-brown film had fair strength and flexibility. The polyimide is represented by recurring units having the formula:

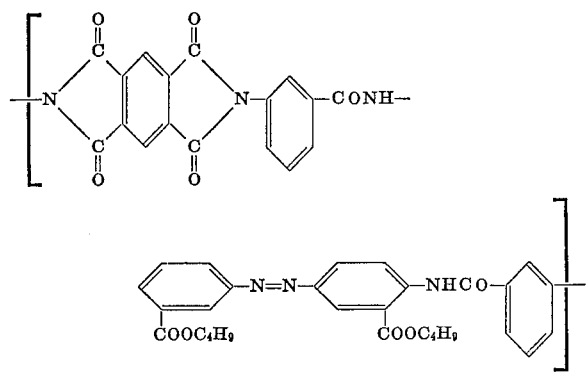

EXAMPLE III 3,3' - dicarboxy - 4,4' - bis(4-aminophenoxy)azobenzene was synthesized from 2 - carboxy - 4-nitro-4'-acetamidodiphenyl ether (Goldberg and Walker, J. Chem. Soc. 1953, 1352) in a four-step synthesis:

(1) Esterification with methanol to 2-carbomethoxy-4-nitro-4'-acetamidodiphenyl ether (I)

(2) Conventional hydrogenation with Pd on carbon to 2 - carbomethoxy - 4 - amino - 4' - acetamidodiphenyl ether (II)

(3) Catalytic oxidative coupling as follows: 15 g. of (II) were added to an oxidized (with oxygen) solution of 2.0 g. of cuprous chloride in 200 ml. of pyridine. The reaction mixture absorbed 541 ml. of $O_2$ in 6 hours at temperatures between 27 and 47.5° C. The resulting product, 3,3'-dicarboxy - 4,4' - bis(4-acetamido phenoxy) azobenzene (III) (71% crude yield) was filtered off and recrystallized from pyridine. M.P. 267° (dec.).

(4) Hydrolysis of III to give the final product. 5.3 g. of III were refluxed for 38 hours with a mixture of 4.7 g. of KOH, 100 ml. of water and 30 ml. of ethanol. By acidification with 50% acetic acid, a yellow compound was obtained. M.P. 273° C. (dec.).

*Analysis.*—Calculated for $C_{26}H_{20}N_4O_6$ (percent): C, 64.46; H, 4.16; N, 11.57. Found (percent): C, 64.19; H, 4.72; N, 11.12.

Polymer preparation

To a chilled solution of 0.968 g. (0.002 mole) of 4,4'-bis(p-aminophenoxy) - 3,3' - dicarboxyazobenzene in 8 ml. of dimethylacetamide (DMAc) was added 0.436 g. (0.002 mole) of pyromellitic dianhydride. The condensation was conducted at 0–2° for 2 hrs., 2 ml. more of solvent was added and the dope was stirred at ambient temperature for 16 hrs. The inherent viscosity (0.5% solution in DMAc) of the intermediate poly(amic acid) was 1.39. The polyimide was obtained by dry-casting the dope with an initial drying at 95° for 1 hr., then curing the resultant film at 140° for 16 hrs. and at 300° for 5 hrs. The resultant red-brown film had fair strength and flexibility. Conversion to the polyimide was also effected by treating the film cast at 95° with a solution of acetic anhydride/pyridine (3/2 by volume) then redrying at 95°. The resultant light brown film had good strength and flexibility. The polyimide is represented by repeating units having the following formula:

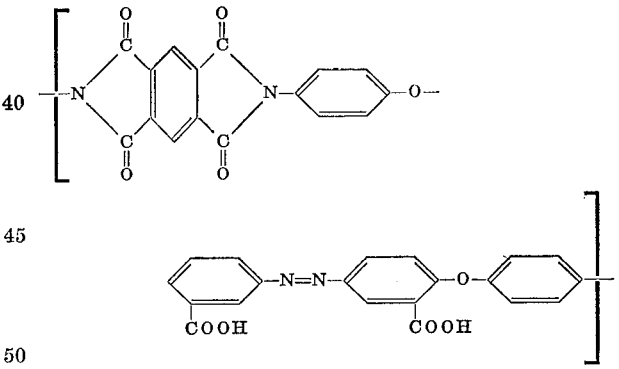

We claim:
1. An ordered fiber or film-forming polymer consisting essentially of recurring units represented by a formula selected from the group consisting of

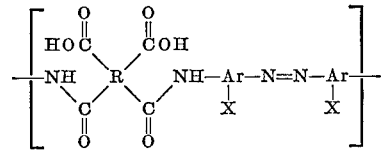

and

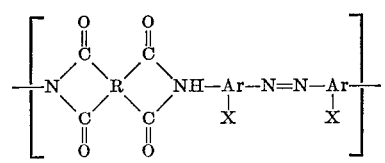

wherein R represents a tetravalent aromatic radical having paired valence bonds on adjacent cyclic carbon atoms and

represents an asymmetrical divalent aromatic radical where —X is an acid group, a salt thereof or a derivative hydrolyzable to an acid group, a mercapto group or a derivative hydrolyzable to a mercapto group, or an hydroxyl group or a derivative hydrolyzable to an hydroxyl group, wherein said acid group is a carboxylic acid group, a sulfinic acid group, a sulfonic acid group, an oxysulfonic acid group, a phosphonic acid group, or an oxyphosphonic acid group, where said salt is an alkali metal salt, alkaline earth metal salt, an ammonium salt or a salt of a primary or secondary amine having up to twelve carbon atoms, wherein said derivative hydrolyzable to an acid group is an acid halide, a phenolic ester, an ester of an aliphatic or alicyclic alcohol having up to twelve carbon atoms or an amide of ammonia or of a primary or secondary amine having up to twelve carbon atoms, wherein said derivative hydrolyzable to a mercapto group and said derivative hydrolyzable to an hydroxyl group is an aromatic, aliphatic or alicyclic ether of said hydroxyl group or said mercapto group having up to twelve carbon atoms or an ester of an aromatic, aliphatic or alicyclic carboxylic acid having up to twelve carbon atoms and said hydroxyl or said mercapto group.

2. The polymer of claim 1 wherein —X represents a carboxylic acid group attached to an aromatic carbon atom, a salt of the acid, an ester, an amide, or an acid halide thereof.

3. The polymer of claim 1 wherein

represents an asymmetrical divalent multi-ring aromatic radical where at least two aromatic rings are linked through aromatic carbon to aromatic carbon valence bonds or through a divalent linking group selected from the group consisting of

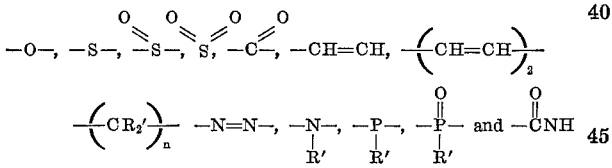

where R' represents hydrogen or a lower alkyl radical and $n$ is an integer of from 1 to 6.

4. An ordered fiber or film-forming polyimide consisting essentially of recurring units represented by the formula

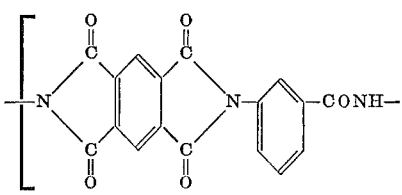

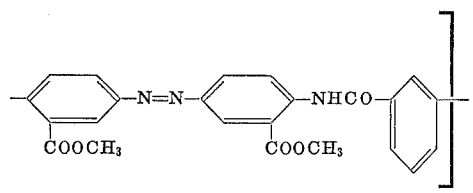

5. An ordered fiber or film-forming polyimide consisting essentially of recurring units represented by the formula

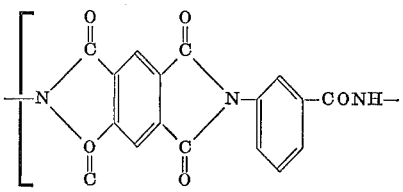

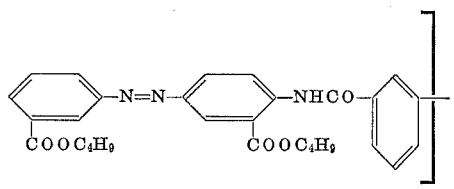

6. An ordered fiber or film-forming polyimide consisting essentially of recurring units represented by the formula

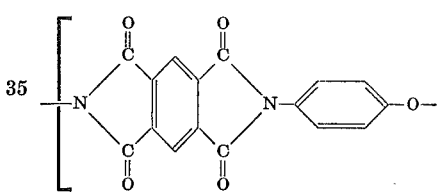

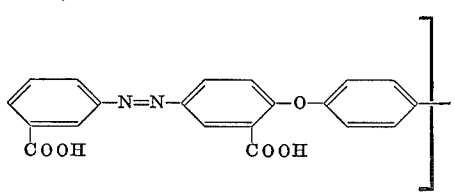

References Cited

UNITED STATES PATENTS

| | | | |
|---|---|---|---|
| 3,437,636 | 4/1969 | Angelo | 260—47 |
| 3,455,879 | 7/1969 | Gay et al. | 260—47 |

WILLIAM H. SHORT, Primary Examiner

L. L. LEE, Assistant Examiner

U.S. Cl. X.R.

117—124E, 128.4, 132B, 148, 155; 161—227, 260—30.2, 30.6R, 30.8R, 30.8DS, 32.6N, 65, 78TR